United States Patent [19]

Anzue et al.

[11] Patent Number: 4,974,860
[45] Date of Patent: Dec. 4, 1990

[54] SEALING DEVICE

[75] Inventors: Kaoru Anzue, Nihonmatsu; Jun Isomoto; Nobuo Takei, both of Kyoto, all of Japan

[73] Assignees: NOK Corporation; Mitsubishi Jidosha Kogyo Kabushiki Kaisha, both of Tokyo, Japan

[21] Appl. No.: 362,870

[22] Filed: Jun. 7, 1989

[30] Foreign Application Priority Data

Jun. 14, 1988 [JP] Japan ................................ 63-78534

[51] Int. Cl.⁵ .............................................. F16J 15/32
[52] U.S. Cl. ......................................... 277/25; 277/37; 277/152
[58] Field of Search ...................... 277/25, 35, 37, 38, 277/92, 152; 384/482, 486, 478

[56] References Cited

U.S. PATENT DOCUMENTS

| 2,418,707 | 4/1944 | Grout | 277/25 |
| 2,478,649 | 8/1949 | Wightman | 277/25 |
| 2,637,574 | 5/1953 | Diehl | 277/25 |
| 3,038,733 | 6/1962 | Hudson et al. | 277/25 |
| 3,306,683 | 2/1967 | Deuring | 384/486 |
| 3,685,838 | 8/1972 | Malmstrom | 277/25 |
| 3,963,248 | 6/1976 | Bainard | 277/92 |
| 4,252,329 | 2/1981 | Messenger | 277/37 |
| 4,428,586 | 1/1989 | Romero | 277/25 |
| 4,448,426 | 5/1984 | Jackowski et al. | 277/37 |
| 4,513,976 | 4/1985 | Bentley et al. | 277/25 |

Primary Examiner—Allan N. Shoap
Assistant Examiner—Daniel G. DePumpo
Attorney, Agent, or Firm—Oliff & Berridge

[57] ABSTRACT

A sealing device is adapted to be disposed between a stationary part and a rotary shaft in the stationary part so as provide a seal in the gap between the stationary part and the rotary shaft. The sealing device has a slinger secured to one of the stationary part and the rotary shaft and a rubber seal secured to the other of the stationary part and the rotary shaft and provided with a lip which makes a resilient pressure contact with the slinger. When the rotation speed of the rotary shaft is increased, centrifugal force is increased to cause a tendency to decrease the pressure of contact between the lip and the slinger so that the wear of the lip is prevented to improve the durability of the sealing device. In addition, the resistance torque produced by the sealing device is not increased substantially even when the speed of rotation of the rotary shaft is increased.

8 Claims, 5 Drawing Sheets

SEALING DEVICE

BACKGROUND OF THE INVENTION

The present invention relates to a sealing device and, more particularly, to a sealing device which suffers from reduced wear and which is capable of improving sealing effect.

In general, a sealing device is disposed between a stationary part and a rotary shaft such that the sealing device is penetrated by the rotary shaft so as to provide a seal in the gap between the rotary shaft and the stationary part. FIGS. 4 to 6 illustrate the construction of a typical example of the sealing device of the kind described.

The sealing device shown in these Figures has a slinger 43 composed of a tubular portion 43b through which the rotary shaft 41 extends and a radial portion 43a provided on one axial end of the tubular portion 43b and extending radially outwardly therefrom, and a rubber seal 45 which is disposed on the outer side of the tubular portion 43b of the slinger 43. The rubber seal 45 has a reinforcement member 44 embedded therein. The reinforcement member has a substantially L-shaped cross-section with one leg 44a thereof being directed towards the slinger 43.

The rubber seal 45 has outer peripheral surface fitting in the bore in the stationary part 42, and is provided, at its portion near the end of the reinforcement member 44 adjacent the slinger 43, with a lip 45a contacting the radial portion 43a of the slinger 43 and a lip 45b which is directed towards the tubular portion 43b on the rotary shaft 41.

In order to impart a high oil-gathering effect produced by the lips 45a and 45b, a spiral groove 46 starting at the center and terminating at the peripheral end is formed in the surface of the radial portion 43a of the slinger 43 facing the lip 45a.

In operation, the slinger 43 rotates together with the rotary shaft 41 as a unit therewith, with the lip 45a of the rubber seal 45 keeping a sliding contact with the radial portion 43a of the slinger 43 thereby attaining a sealing effect.

This known sealing device, however, suffers from the following disadvantages.

In operation, the spiral groove 46 formed in the radial portion 43a of the slinger 43 serves to displace the oil radially outwardly during rotation of the slinger 43 as shown in FIG. 6. In addition, the pressure at which the lip 45a contacts with the slinger 43 is kept constant regardless of the rotation speed 41 of the rotary shaft 41. In consequence, the lip 45a is rapidly worn down due to sliding contact with the radial portion 43a of the slinger 43 during rotation of the rotary shaft 41, thus impairing durability of the sealing device, and the load torque is undesirably increased as the rotation speed increases.

SUMMARY OF THE INVENTION

Accordingly, an object of the present invention is to provide a sealing device in which the sliding frictional resistance between the lip and the slinger is reduced to suppress the wear of the lip.

Another object of the present invention is to provide a sealing device in which the load torque produced by the sealing device is reduced during high-speed rotation of the rotary shaft.

To this end, according to the present invention, there is provided a sealing device adapted to be disposed between a stationary part and a rotary shaft in the stationary part so as to provide a seal in the gap between the stationary part and the rotary shaft, the sealing device comprising a slinger secured to one of the stationary part and the rotary shaft and a rubber seal secured to the other of the stationary part and the rotary shaft and provided with a lip which makes a resilient pressure contact with the slinger. When the rotation speed of the rotary shaft is increased, centrifugal force is increased to cause a tendency to decrease the pressure of contact between the lip and the slinger so that the wear of the lip is prevented and improves the durability of the sealing device. In addition, the resistance torque produced by the sealing device is not increased substantially even when the speed of rotation of the rotary shaft is increased.

These and other objects, features and advantages of the following description of the preferred embodiments when the same is read in conjunction with the accompanying drawings.

DESCRIPTION OF THE PREFERRED EMBODIMENTS

Figure 1:
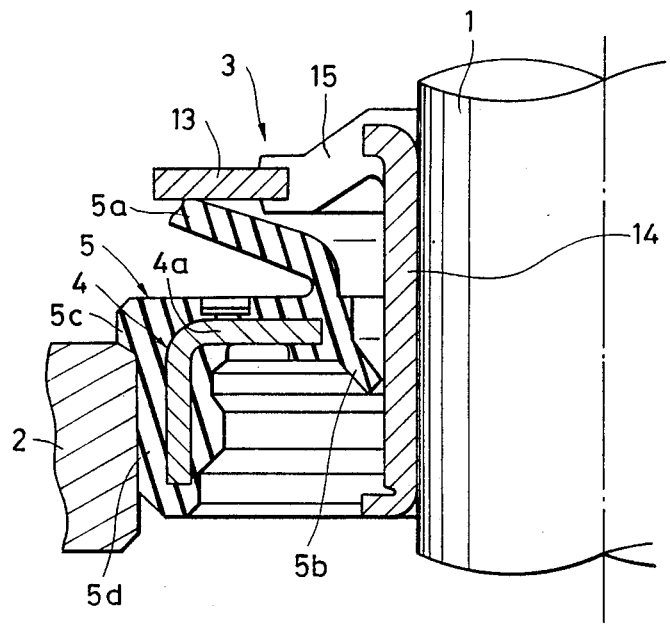
FIG. 1 is a sectional view of a first embodiment of the sealing device in accordance with the present invention, taken at a plane which includes the axis of a rotary shaft on which the sealing device is set.
Figure 2:
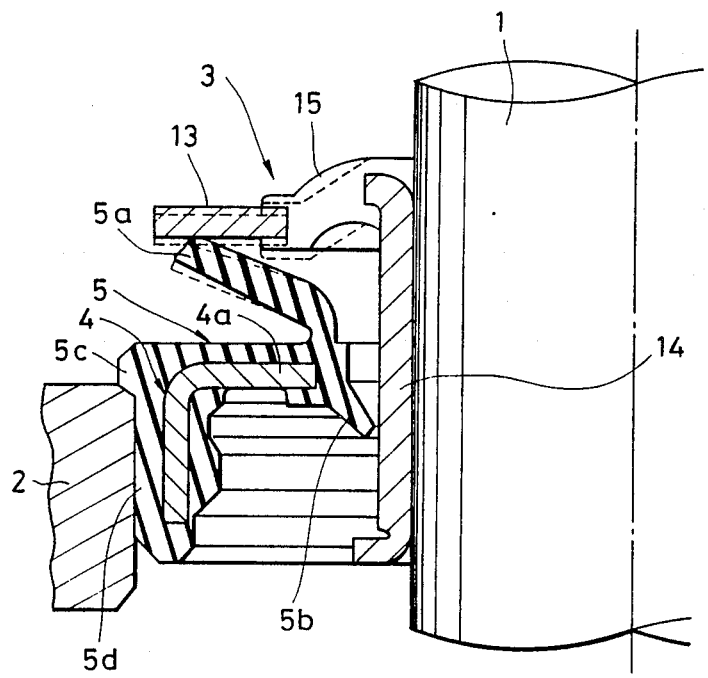
FIG. 2 is a sectional view of the sealing device shown in FIG. 1 in a state under the influence of centrifugal force generated as a result of high-speed rotation.

FIGS. 1 and 2 show the preferred embodiment of the sealing device in accordance with the present invention. The sealing device is composed of a slinger 3 and a rubber seal 5.

The slinger 3 has a tubular member 14 through which a rotary shaft 1 extends, a ring member 13 on the radially outer side of the tubular member 14 and a resilient member 15 which interconnects the tubular member 14 and the ring member 13. The resilient member 15, which interconnects the ring member 13 and the slinger 14, does not extend in the direction perpendicular to the axis of the rotary shaft 1 but extends in a direction which is inclined at a predetermined angle to the direction which is perpendicular to the axis of the rotary shaft 1.

The rubber seal 5 is provided with a reinforcement member 4 embedded therein. The reinforcement member 4 has a substantially L-shaped cross-section with its one leg 4a directed towards the tubular member 14 of the slinger 3. The rubber seal 5 surrounds the tubular member 14 of the slinger 3, and has a stepped outer peripheral surface the reduced-diameter portion 5d of which fits in the stationary part 2. The rubber seal 5 is provided at its portion adjacent to the slinger 3 with a lip 5a which resiliently contacts with the ring member 13 of the slinger 3 and also with a lip 5b which is directed towards the tubular member 14 of the slinger.

In operation, the rotation of the rotary shaft 1 causes the ring member 13 of the slinger 3 to rotate in sliding contact with the lip 5a of the rubber seal 5 so as to provide a high sealing effect.

As the speed of rotation of the rotary shaft 1 increases, the resistance torque tends to increase. In the sealing device of the invention, however, centrifugal force acts on the slinger 3 which rotates as a unit with the rotary shaft 1 so that the ring member 13 of the slinger 3 so as to be displaced from the position indicated by broken lines to the position shown by the solid lines in FIG. 2, overcoming the resilient force of the resilient member 15. Thus, the ring member 13 tends to move away from the lip 5a of the rubber seal 5.

On the other hand, the lip 5a of the rubber seal 5 also deflects from the state shown by broken lines to the state shown by solid lines so as to be kept in contact with the ring member 13 of the slinger 3. In this state, however, the pressure of contact between the lip 5a and the ring member 13 is small as compared with the case where the speed of rotation of the rotary shaft 1 is low. It is therefore possible to maintain the resistance torque at a sufficiently low level even when the rotation speed of the rotary shaft 1 is increased. In addition, since only the reduced-diameter portion 5d of the rubber seal 5 fits in the stationary part 2 while the large-diameter portion 5c contacts with a side surface of the stationary part 2, the rubber seal 5 is prevented from moving axially even when a force is generated in the axial direction of the rotary shaft 1, thus preventing undesirable axial shift of the sealing device.

The provision of the step on the outer peripheral surface of the rubber seal 5 is not essential. Namely, the rubber seal 5 may have a straight outer peripheral surface, i.e., only the reduced-diameter portion 5d which fits in the stationary part 2.

Figure 3:
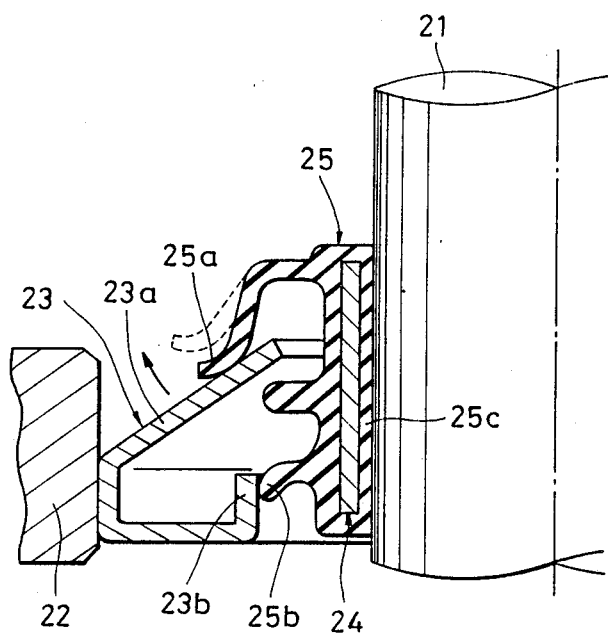
FIG. 3 is a sectional view of a second embodiment of the sealing device of the present invention.
Figure 4:
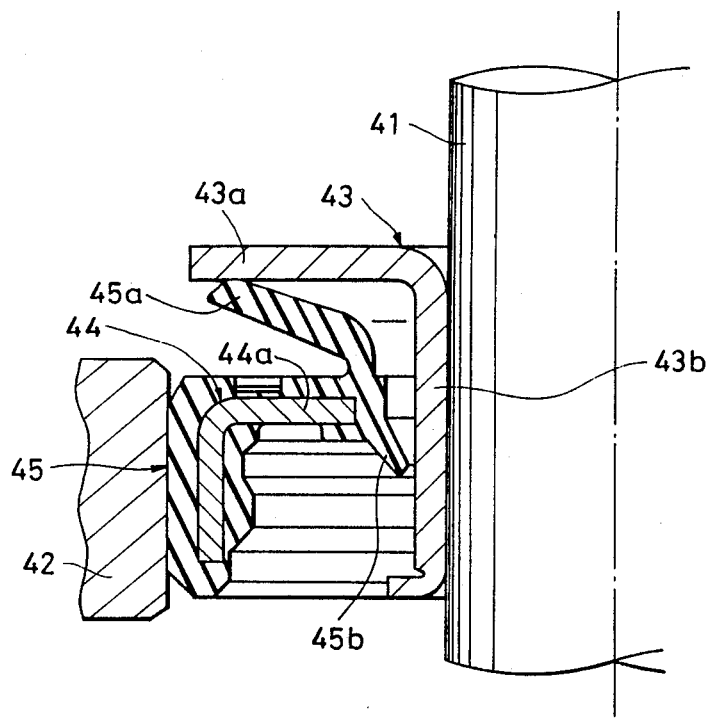
FIG. 4 is a sectional view of a known sealing device.
Figure 5:
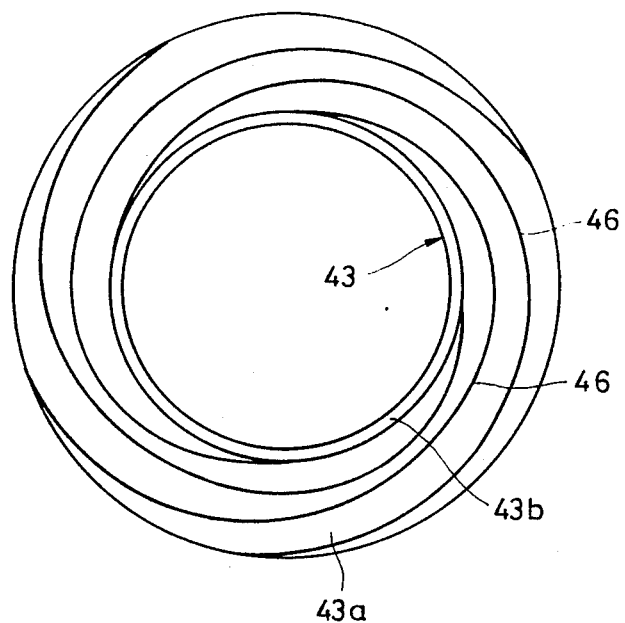
FIG. 5 is a bottom plan view of a slinger incorporated in the sealing device of FIG. 4.
Figure 6:
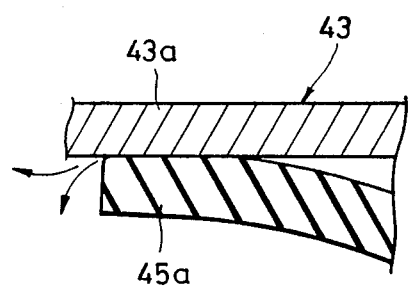
FIG. 6 is an illustration of the relationship between the slinger and the rubber seal lip.

FIG. 3 shows another embodiment of the sealing device in accordance with the present invention.

In contrast to the first embodiment which is composed of the rubber seal 5 secured to the stationary part 2 and the slinger 3 secured to the rotary shaft 1, the second embodiment is composed of a rubber seal 25 secured to the rotary shaft 21 and a stationary element 23 secured to the stationary part 22.

The stationary element 23 has an annular form and is composed of a slant portion 23a and an axial protruding portion 23b protruding in the axial direction of the rotary shaft 21.

The rubber seal 25 has a tubular portion 25c through which the rotary shaft 21 extends and having a reinforcement member 24 embedded therein, a lip 25a provided on one end of the tubular portion 25c and held in resilient contact with the slant portion 23a of the slinger 23, and a dust strip 25b contacting with the protruding portion 23b.

In operation, the rubber seal 25 rotates as a unit with the rotary shaft 21.

The lip 25a of the rubber seal 25 rotates in sliding contact with the surface of the slant portion 23a of the stationary element 23 so as to form a reliable seal therebetween. Meanwhile, the dust strip 25b of the rubber seal 25 rotates in sliding contact with the protruded portion 23b of the stationary element 23 so as to prevent dust and other foreign matters from coming into the seal.

When the rotation speed of the rotary shaft 21 is increased, the resistance torque tends to increase. In the second embodiment of the sealing device, centrifugal force acts on the rubber seal 25 which rotates as a unit with the rotary shaft 21 so that the lip 25a of the rubber seal tends to be deflected radially outwardly so as to reduce the pressure with which it is pressed on the surface of the slant portion 23a. As the rotation speed of the shaft 21 further increases to exceed a predetermined speed, the contact pressure is materially nullified so as to realize a non-contact state.

During the high-speed rotation of the rotary shaft 21, therefore, the rubber seal 25 is completely kept out of contact with the stationary element 23 so that the wear of the rubber seal is effectively prevented. During rotation of the rotary shaft 21 at a comparatively low speed, a comparatively small centrifugal force is generated to reduce the pressure of the resilient contact between the lip 25a and the stationary element 23 as compared with the case where the rotary shaft 21 is not rotating. In this state, a reliable seal is formed due to the resilient pressure contact between the lip 25a and the stationary element 23 while the wear of the lip 25a is reduced by virtue of the reduced contact pressure. In addition, the load torque does not increase substantially even when the speed of rotation of the rotary shaft 21 is increased.

We claim:

1. A sealing device which is to be provided between a stationary part and a rotary shaft which extends through said stationary part so as to form a seal in a gap between said stationary part and said rotary shaft, said rotary shaft rotating about an axis, said sealing device comprising: a slinger secured to one of said stationary part and said rotary shaft; and a rubber seal secured to the other of said stationary part and said rotary shaft and having a lip which resiliently contacts said slinger; said lip and said slinger making a sliding contact with each other during rotation of said rotary shaft wherein the pressure of contact between said lip and said slinger is reduced as a result of action of a centrifugal force, said rubber seal further comprising a second lip directed towards a portion of said slinger spaced axially from said sliding contact.

2. A sealing device according to claim 1, wherein said slinger includes a tubular member and a ring member which is connected through a resilient member to said tubular member and contacting with said lip of said rubber seal, said tubular member fits on the surface of said rotary shaft so as to be fixed to said rotary shaft, said ring member being movable in the axial direction of said rotary shaft through a deflection of said resilient member due to centrifugal force generated during rotation of said rotary shaft.

3. A sealing device according to claim 1, wherein said rubber seal has a stepped outer peripheral surface so as to have a reduced-diameter portion which fits in said stationary part.

4. A sealing device according to claim 1, wherein said rubber seal has a reinforcement member embedded therein.

5. A sealing device which is to be provided between a stationary part and a rotary shaft which extends through said stationary part so as to form a seal in the gap between said stationary part and said rotary shaft, said sealing device comprising:

a rubber seal element having a tubular body secured to said stationary part and provided with a lip portion; and a slinger element, said slinger element comprising a tubular member, a ring member, and a resilient member connecting said tubular member and said ring member, said tubular member affixed to an outer surface of said rotary shaft and said ring member contacting said rubber seal element and being capable of axial movement relative to said rotary shaft due to a deflection of said resilient member by centrifugal force generated during rotation of said rotary shaft, wherein said lip portion of said rubber seal element makes a resilient sliding pressure contact with said ring member of said slinger element during rotation of said rotary shaft and the pressure contact between said lip and said ring member is reduced due to the axial movement of said ring member of said slinger element.

6. A sealing device according to claim 5, wherein said rubber seal has a stepped outer peripheral surface so as to have a reduced-diameter portion which fits in said stationary part.

7. A sealing device according to claim 5, wherein said rubber seal has a reinforcement member embedded therein.

8. A sealing device according to claim 5 wherein said rubber seal has a second lip directed towards said tubular member of said slinger.

* * * * *